United States Patent [19]

Farmont

[11] Patent Number: 5,498,859
[45] Date of Patent: Mar. 12, 1996

[54] PARKING CARD FOR THE CHARGE-RELATED ACTUATION OF A PARKING BARRIER

[75] Inventor: Johann Farmont, Dusseldorf, Germany

[73] Assignee: Farmont Technik GmbH & Co., Dusseldorf, Germany

[21] Appl. No.: 177,007

[22] Filed: Jan. 3, 1994

Related U.S. Application Data

[63] Continuation-in-part of Ser. No. 84,545, Jun. 29, 1993, abandoned.

[30] Foreign Application Priority Data

Feb. 20, 1993 [DE] Germany .............................. 9302481 U
Jun. 30, 1993 [EP] European Pat. Off. .............. 93110433

[51] Int. Cl.$^6$ ..................................................... G07B 15/02
[52] U.S. Cl. ........................... 235/384; 40/27.5; 194/214; 194/902; 235/492
[58] Field of Search ..................... 235/487, 382, 235/384, 492, 435; 40/27.5; 194/214, 902

[56] References Cited

U.S. PATENT DOCUMENTS

| | | |
|---|---|---|
| 2,063,356 | 12/1936 | Wiggins . |
| 3,397,764 | 8/1968 | Simjian . |
| 3,766,452 | 10/1973 | Burpee . |
| 4,101,701 | 7/1978 | Gordon . |
| 4,257,436 | 3/1981 | Smith . |
| 4,319,674 | 3/1982 | Riggs et al. ............................. 194/210 |
| 4,380,699 | 4/1983 | Monnier et al. ......................... 235/487 |
| 4,395,043 | 7/1983 | Gargione . |
| 4,585,930 | 4/1986 | Cosden . |
| 4,674,618 | 6/1987 | Eglise et al. ............................ 235/487 |
| 4,703,164 | 10/1987 | Von Ballmoos ......................... 235/384 |
| 4,717,815 | 1/1988 | Tomer ..................................... 235/384 |
| 4,788,102 | 11/1988 | Koning . |
| 4,865,222 | 9/1989 | Sullivan . |
| 4,868,373 | 9/1989 | Opheij . |
| 4,926,996 | 5/1990 | Eglise . |
| 4,960,983 | 10/1990 | Inoue ...................................... 235/492 |
| 4,969,549 | 11/1990 | Eglise . |
| 4,982,070 | 1/1991 | Bézin et al. ............................ 235/492 |
| 4,990,759 | 2/1991 | Gloton et al. .......................... 235/492 |
| 5,206,495 | 4/1993 | Kreft ...................................... 235/492 |
| 5,208,110 | 5/1993 | Smith et al. . |

FOREIGN PATENT DOCUMENTS

| | | |
|---|---|---|
| 391375 | 4/1990 | Austria . |
| 402821 | 12/1990 | European Pat. Off. . |
| 2625351 | 6/1989 | France . |
| 2231720 | 1/1973 | Germany . |
| 2557984 | 6/1977 | Germany . |
| 2628595 | 1/1978 | Germany . |
| 2926867 | 1/1981 | Germany . |
| 3307986 | 9/1983 | Germany . |
| 3608165 | 9/1986 | Germany . |
| 4021770 | 1/1992 | Germany . |
| 3339387 | 4/1993 | Germany . |
| 60-215288 | 10/1985 | Japan . |
| 4004495 | 8/1992 | Japan . |
| 5-189626 | 7/1993 | Japan ..................................... 237/487 |
| 654942 | 3/1982 | Switzerland . |
| 124 | of 1854 | United Kingdom . |
| 89/12286 | 12/1989 | WIPO . |
| 91/14237 | 9/1991 | WIPO . |

Primary Examiner—F. L. Evans
Attorney, Agent, or Firm—Steven F. Caserza; Flehr, Hohbach, Test, Albritton & Herbert

[57] ABSTRACT

The invention relates to a parking card which is intended for the charge-related actuation of a parking barrier and is in the form of a sheet-like plastic piece having a front side and rear side and having a machine-readable data carrier for storing car-park information and user information and, if appropriate, the entrance time and departure time. In order to provide a parking card which is easily constructed and can be handled with ease and permits the installation of an inexpensive parking service system, the invention provides that the plastic piece (1) is in the form of a round coin, on or in which there is mounted an identification and/or communication component (5) which operates in a contactless manner and comprises a chip and a data-transmission device which emits electromagnetic waves.

13 Claims, 1 Drawing Sheet

5,498,859

PARKING CARD FOR THE CHARGE-RELATED ACTUATION OF A PARKING BARRIER

RELATED APPLICATIONS

This application is a continuation-in-part of U.S. patent application Ser. No. 08/084,545 filed Jun. 29, 1993, now abandoned. Other related applications are as follows:

| U.S. Ser. No. | Filing Date |
| --- | --- |
| 08/176,956 | January 3, 1994 |
| 08/177,002 | January 3, 1994 |
| 08/177,006 | January 3, 1994 |
| 08/196,648 | February 15, 1994 |
| 08/309,093 | September 20, 1994 |

BACKGROUND OF THE INVENTION

1. Field of the Invention

The invention relates to a parking card which is intended for the charge-related actuation of a parking barrier and is in the form of a sheet-like plastic piece having a front side and a rear side and having a machine-readable data carrier for storing car-park information and user information and, if appropriate, the entrance time and departure time.

2. Description of the Prior Art

Parking cards of this type are issued to the user on passing entrance-control stations of a multi-storey car park or open-air car park, the data necessary for calculation of parking charges being stored on the parking card. The use of paying machines with a computer-controlled method of proceeding with the parking operations makes it necessary to store the various items of parking information or identification codings in a machine-readable manner. Use is thus made of, on the one hand, so-called magnetic-card tickets which consist of paper and have a magnetic strip for storing the individual items of parking data and, on the other hand, plastic tickets with an individualizing identification coding, e.g. a bar code, or an integrated, programmable chip.

Whereas the magnetic-card ticket which consists of paper can only be used once, the parking cards which consist of plastic and of a programmable chip or an identification coding can be used for successive parking operations, to be precise as a single parking card for different users, as a debit parking card or as an access card for long-stay parkers. Repeated collection and issuing of the plastic parking cards requires entrance-control and departure-control stations which store the parking cards to be issued, feed them to a read/write station and deliver them in issuing openings which are accessible to the car-park user. For the calculation of the parking times and parking charges to proceed in a problem-free manner, the parking cards consequently have to cover a plurality of transport paths, for which purpose conveying belts or conveying rollers are generally provided. Owing to the frequent buckling of the parking cards during their transport to the read/write stations, the likelihood of disruption is great, with the result that a smooth issuing operation and/or collection of the parking cards is not ensured. The likelihood of disruption is increased to an even greater extent by the fact that it is possible to read the machine-readable data carriers from only one direction.

The object of the invention is thus to provide a parking card, which is easily constructed and can be handled with ease and permits the installation of an inexpensive parking service system.

SUMMARY OF THE INVENTION

A parking card, for a parking service system, which, owing to its rolling capacity, can move without complex transport devices and, due to its position-independent readability, if appropriate also its capacity for receiving recordings, can be moved in various positions to a read/write station or communication device. Owing to the combination, according to the invention, of parking-card configuration and the type of design of the machine-readable data carrier, the handling advantages of a round shape can be exploited to the full. In addition, said parking card can be re-used, is stable and can be inexpensively produced. The electronic component, which operates in a contactless manner and can be at least stored, but may also be programmable, permits use without wear due to repeated scanning.

The parking card can thus be used for a plurality of successive parking operations, as a result of which the operating costs are kept low. Each parking card obtains an individual identification coding or identification number, with the result that, by means of said parking card, the parking charges can be calculated, in dependence on entrance time and parking duration, by an associated computer unit of a parking system.

A parking card with programmable chip further makes it possible to acquire and store the items of parking data themselves, with the result that the entrance and departure stations can form isolated communication stations and linking the entrance and departure stations to the computer unit by cabling is thus no longer necessary.

The thickness of the parking card preferably lies between 2 and 4 mm. Such a thickness ensures a good stability which assists the rolling capacity of the parking card. The diameter of the parking card may lie between 20 and 70 mm and is preferably from 35 to 50 mm. This diameter makes the parking card particularly easy to handle for the user of a multi-storey car park or open-air car park.

For a visual display of the ongoing parking time after entry into a car park, the front side of the parking card may have a digital time display which is provided with a clockwork which is set in operation when a parking card is issued. The ongoing parking time is then constantly displayed to the user via the parking card which he/she has taken away.

In order to improve the sorting and/or stacking properties for storing in the collection and issuing locations, the round parking card may have a central through-passage, in particular a round central hole.

The identification and/or communication component can operate passively and without a battery or actively.

The passively operating identification and/or communication component can operate in accordance with inductive energy-transmission and data-transmission technology which is distinguished by low energy consumption and a high data-transmission rate. In addition, said components are robust, unsusceptible to soiling and, owing to the lack of their own energy source, can be used on a permanent basis.

The actively operating identification and/or communication components simplify the construction of the communication stations, but only have a limited service life due to the integrated batteries.

For an optimum design of the position-independent data transmission, preferably omnidirectional waves are produced and emitted by the data-transmission devices.

Finally, said parking card makes it possible to construct a simple and inexpensive parking service system.

Further configurations of the invention can be gathered from the following description.

BRIEF DESCRIPTIONS OF THE DRAWINGS

The invention is illustrated in more detail hereinbelow with reference to the exemplary embodiments represented in the accompanying figures, in which:

FIG. 1 shows, schematically, a plan view of a first exemplary embodiment of the parking card, FIG. 2 shows, schematically, a side view of the parking card according to FIG. 1, FIG. 3 shows, schematically, a plan view of a second exemplary embodiment of the parking card, FIG. 4 shows, schematically, a side view of the parking card according to FIG. 3, and FIG. 5 shows, schematically, a plan view of a third exemplary embodiment of the parking card.

DETAILED DESCRIPTION OF A PREFERRED EMBODIMENT

Figure 1:
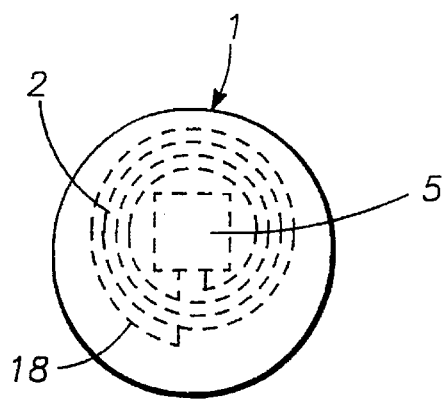
Figure 2:
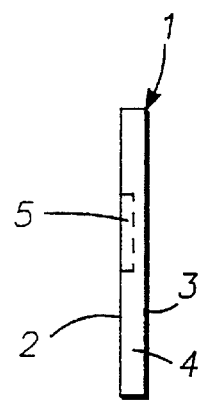

FIGS. 1 and 2 show a first exemplary embodiment of a parking card which is intended for the charge-related actuation of a parking barrier and is in the form of a sheet-like plastic piece 1 having a front side 2 and a rear side 3 which are arranged at a distance from, and parallel to, each other. The front side 2 and the rear side 3 delimit a plastic piece 1 which is designed such that it is round. The parking card is thus in the form of a round coin which can roll away via a border 4 forming the circumferential surface. The space between the front side 2 and the rear side 3 is filled entirely with plastic material, with the result that the plastic piece 1 is designed to be solid. The space between front side 2 and rear side 3 may also, however, be only partially filled, with the result that the plastic piece has a hollow inner structure in order, if appropriate, to be able to adjust the rolling properties in dependence on the weight of the parking card.

A machine-readable data carrier is, furthermore, inserted into the front side 2, said data carrier being an electronic identification and/or communication component 5 which responds or operates in a contactless and position-independent manner and is designed for storing and/or reading various items of parking information. Said data-carrier component 5 may terminate flush with the front side 2 or be located, beneath or behind the front side 2, in a cutout in the plastic piece 1, with the result that the data-carrier component 5 is enveloped by the plastic piece 1. The data-carrier component 5 may be arranged, on or in the parking card, in the centre or at the sides or off-centre.

Figure 3:
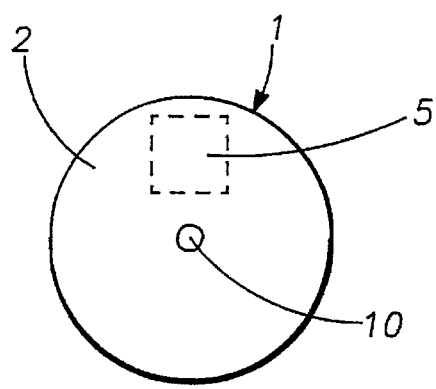
Figure 4:
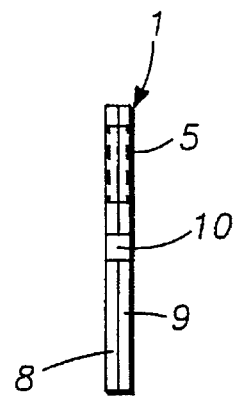

As shown in FIGS. 3 and 4, the round coin may be designed in a number of pieces rather than in one piece. Here, the round coin comprises two discs 8, 9 which can be fixedly connected to each other, can be placed flush against each other and receive the data-carrier component 5 in the inner space enclosed by them. A configuration of this type simplifies the mounting of the data-carrier component 5 in the plastic piece 1 if it is intended for the integration of the data-carrier component 5 not to be visible, in particular from the outside. In addition, the plastic piece 1 has a through-passage 10 which, here, is in the form of a centrally located round hole. Said through-passage 10 may, of course, also be provided in the round parking coin according to FIGS. 1 and 2, which through-passage 10 can be conveniently used to pass a rod therethrough, to allow for easy stacking of a plurality of parking cards of this invention and their subsequent dispensing.

The thickness of the plastic piece 1 according to FIGS. 1 to 4 is 3 mm, but it may, however, vary between 0.5 and 6 mm, and preferably lies between 2 and 4 mm. The diameter of the plastic piece 1 is 40 mm, but it may vary between 20 and 70 mm, and preferably lies between 35 and 50 mm.

Figure 5:
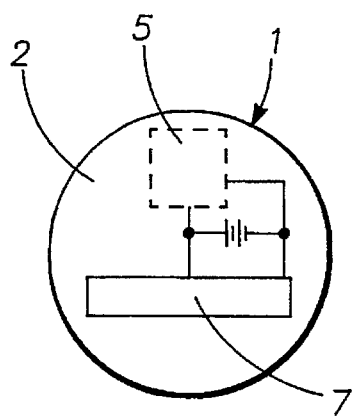

FIG. 5 shows a third exemplary embodiment of the parking card which, in terms of the form of the plastic piece 1 and of the identification and/or communication component 5, is designed in the same way as the first and second exemplary embodiments, but it is further provided with a display section 7 for the visual display of the address of the car park and of the parking-card number in clear lettering and/or of the ongoing parking time. In the case of a display of the ongoing parking time, the front side 2 may have a digital time display which is provided with a clockwork which is set in operation when the parking card is issued.

The identification and/or communication component 5, which operates in a contactless and position-independent manner, comprises a chip and a data-transmission device which emits electromagnetic waves. Said component 5 stores at least one once-only and thus unique code number which can be read out in a contactless and position-independent manner. In addition to its storing capacity, the component 5 may also be capable of processing and, for this purpose, be loaded with individual menus in order to be used as a decentralized data carrier which cannot only be read out but may also be capable of receiving recordings of items of parking information. Consequently, the chip can be re-programmed for each parking operation in order to permit additional processing of the items of parking information. The items of parking information are then contained in the round parking coin and are newly registered for each parking operation, it being possible to erase or overwrite the preceding items of parking information. Consequently, a repeated issuing of the parking card with fixed code or reprogrammable component 5 for short-stay parkers is possible. The same applies for the use of the parking card as a debit parking card or a long-stay parking card.

The identification and/or communication component 5 preferably operates passively and without batteries, to be precise with an inductive transmission of energy and data. The component 5 then comprises a chip and an aerial in the form of a coil, which is used for energy transmission and data transmission. On the chip there are located a storage region, in which the code or an identification number is stored as a fixed value, and an electronic circuit. Chip and coil form an oscillating circuit, the coil being a receiving coil for the inductive energy transmission and a transmitting coil for the data transmission by means of natural resonance of the oscillating circuit in communication with a read/write station. The frequencies of the oscillations produced may lie in the range between 100 and 300 kHz.

A parking card passing into the region of a read/write station of entrance/departure or paying stations consequently receives pulses via its aerial, as a result of which the chip receives a triggering signal and, thereupon, transmits the identification number to the read/write station via the coil. Said data transmission is not subject to direction and is generally carried out via omnidirectional waves and thus in a contactless and position-independent manner. If the storage region on a chip which is capable of processing is formed, for example, by an EEPROM (electrically erasable programmable read-only memory), then the component is also programmable in a contactless and position-independent manner.

The identification and/or communication component 5 may also operate actively and, in this case, has, in addition to a chip which is capable of storing and, if appropriate, is programmable, a transmitter which is activated and sends out its identification number when it passes into the signal range of a read/write station. The energy supply is effected via a battery integrated into the component 5.

The described parking card can be used, as shown in the following, in a parking service system for registering parking times and/or parking charges.

The parking cards in the form of round parking coins are issued, at the entrance of a multi-storey car park or open-air car park, from a supply container, having a vertical shaft, via a dispenser. Before issuing, the respective identification code is read in a contactless and position-independent manner in a read/write station, which the parking card is to pass, and fed to a computer, which adds the entrance time, the date and the station number, and stores these collected items of information. If the parking card is designed as a decentralized data carrier, the entrance time can be stored directly in the parking card, with the result that external data transmission to the computer is dispensed with. By removing the parking card from an ejection slot, an entrance barrier is opened.

At the end of the parking duration, the user introduces the parking card into a paying machine. If the parking card passes into the signal range of a read/write station, the identification is read out again in a contactless and position-independent manner, the entrance time is compared to the actual time by computer and, as a result, the parking charge is established and displayed. After paying the parking charge due, the parking card is released. The computer adopts the new (paying) time and adds an allowance time in which the car-park user has to drive out of the car park. Alternatively, the new (paying) time may be written into the parking card in a contactless and position-independent manner.

Still with the same parking card, the user drives to the exit and introduces the card into a corresponding introduction slot, where it is read once again. If it is valid, the departure barrier is opened and the parking card falls into a collecting container for re-use. In the case of the programmable parking card, the read-in items of parking information are erased, apart from the fixed code.

The parking service system can be used not only by short-stay parkers, but also for long-stay parkers.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed:

1. A parking token for the charge-related actuation of a parking barrier and is in the form of a round plastic piece having an integrated electronic machine-readable identification and communication component comprising a chip for storing a token code for multiple use of said parking token, and said component further comprising a data transmission device which emits electronic waves in a substantially omnidirectional pattern to read out a card code in a contactless and position-independent manner.

2. The parking token according to claim 1, wherein the chip can be programmed for storing and processing entrance times and departure times in addition to an individual identification number and, for this purpose, is readable and can receive recordings.

3. The parking token according to claim 1 wherein the round plastic piece comprises two discs which can be fixedly connected to each other, envelope the identification and communication component and the overall thickness of which is from 2 to 4 mm.

4. The parking token according to claim 1, wherein the plastic piece has a diameter of approximately 20 to 70 mm.

5. The parking token according to claim 1, wherein, for the ongoing parking time, the front side has a digital time display with clockwork and power source.

6. The parking token according to claim 1, wherein the round plastic piece has a central through-passage for sorting and stacking purposes.

7. The parking token according to claim 1, wherein the identification and/or communication component operates passively and has an inductively operable data transmission device with receiving and transmitting properties.

8. The parking token of claim 1, wherein the identification and/or communication component operates actively and is designed with a transmitter as data-transmission device.

9. The parking token of claim 1, wherein the data-transmission device produces and emits omnidirectional waves.

10. The parking token as in claim 1 wherein the plastic piece has a diameter of approximately 35 to 50 mm.

11. The parking token as in claim 6 wherein said through-passage comprises a round hole.

12. A parking token as in claim 1 wherein said chip further stores time information.

13. A parking token as in claim 12 wherein said time information comprises the entrance time to a parking area.

* * * * *